United States Patent [19]

Perret

[11] 4,030,128
[45] June 14, 1977

[54] VIDEO RECORD SCRAMBLING AND UNSCRAMBLING

[75] Inventor: Ludwig A. Perret, La Canada, Calif.

[73] Assignee: Bell & Howell Company, Chicago, Ill.

[22] Filed: Nov. 21, 1974

[21] Appl. No.: 526,019

[52] U.S. Cl. .................. 360/33; 360/70; 360/63; 358/114; 179/1.5 C
[51] Int. Cl.[2] ............... H04N 5/76; H04N 1/44
[58] Field of Search .............. 360/19, 37, 14, 33, 360/18, 22, 23, 24, 27, 63, 60, 70; 179/1.5 C; 358/114, 122, 123

[56] References Cited

UNITED STATES PATENTS

| 2,466,514 | 4/1949 | Vagtborg | 360/60 |
|---|---|---|---|
| 2,601,505 | 6/1952 | Ellett | 178/5.1 |
| 2,913,518 | 11/1959 | Bridges | 178/5.1 |
| 2,929,865 | 3/1960 | Van Jepmond | 178/5.1 |
| 3,506,780 | 4/1970 | Camras | 360/37 |
| 3,583,708 | 6/1971 | Prager | 360/106 |
| 3,647,951 | 3/1972 | Rose | 360/14 |
| 3,668,310 | 6/1972 | Yano | 360/84 |
| 3,824,332 | 7/1974 | Horowitz | 178/5.1 |
| 3,825,944 | 7/1974 | Terao | 360/85 |
| 3,877,070 | 4/1975 | Takenouchi | 360/78 |

FOREIGN PATENTS OR APPLICATIONS

| 1,151,536 | 7/1963 | Germany | 360/70 |
|---|---|---|---|

Primary Examiner—Bernard Konick
Assistant Examiner—Alan Faber
Attorney, Agent, or Firm—Benoit Law Corporation

[57] ABSTRACT

There is disclosed a method of scrambling a video information recording of a type having video information and a video information playback control signal recorded on a recording medium, with the playback control signal being normally in that type of recording recorded in a first track positioned on the recording medium for playback by a specifically positioned playback device in a standard video information playback apparatus. According to the disclosed scrambling method, the video information is recorded on the recording medium, and the video information playback control signal is recorded on the recording medium in a second track different from the mentioned first track.

24 Claims, 8 Drawing Figures

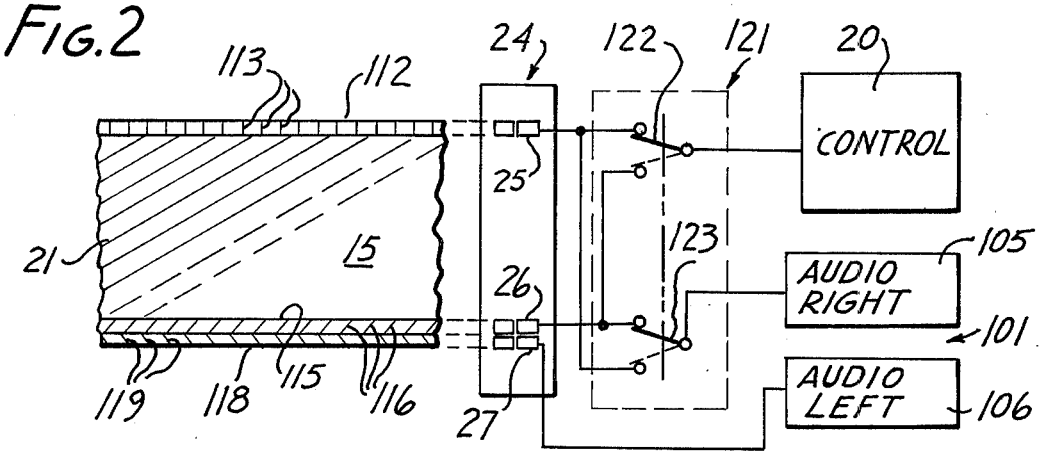
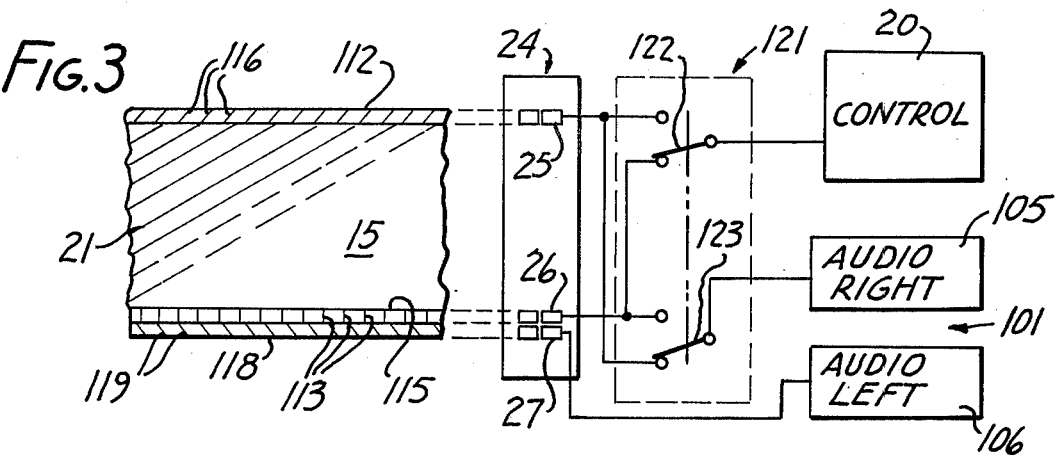
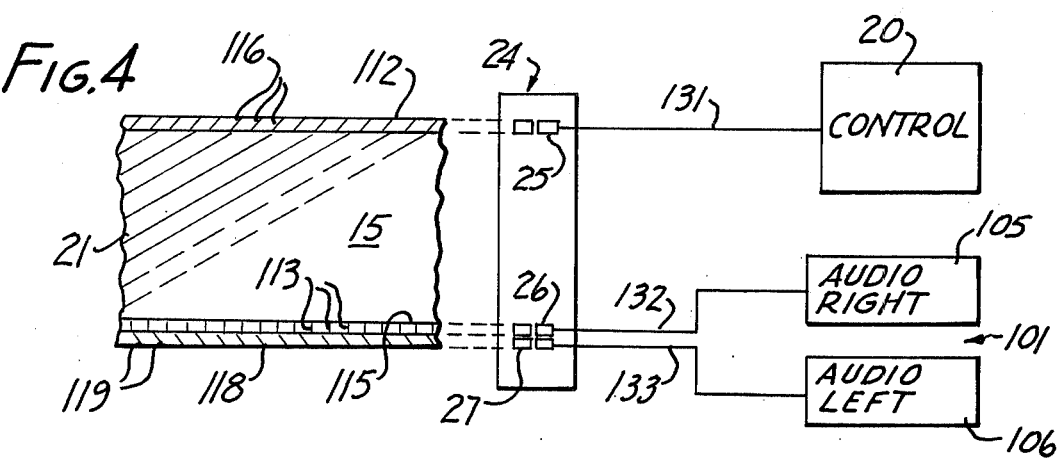

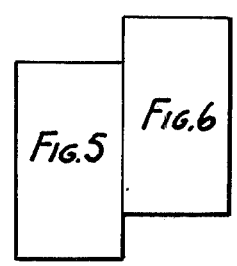
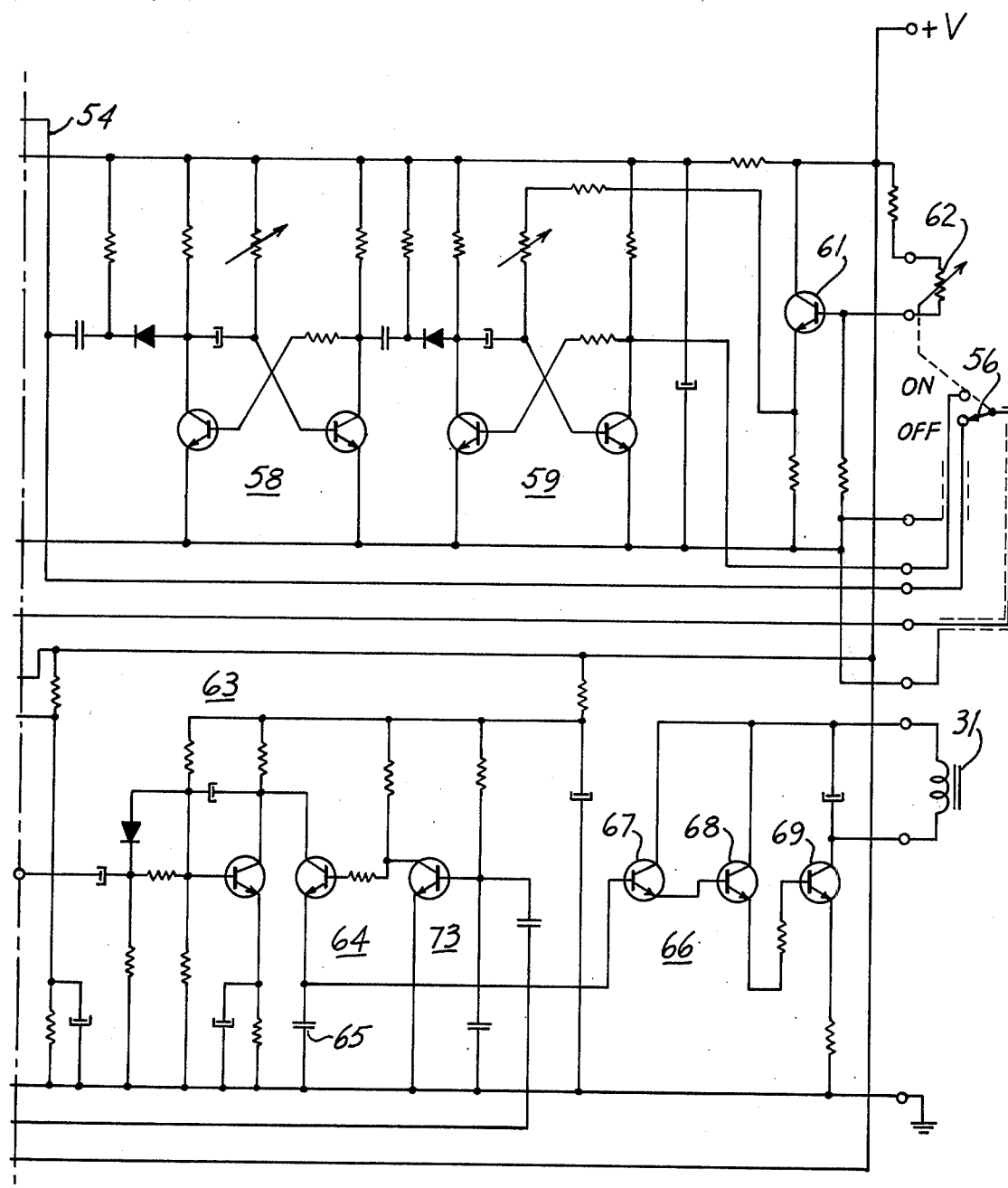

VIDEO RECORD SCRAMBLING AND UNSCRAMBLING

BACKGROUND OF THE INVENTION

1. Field of the Invention

The subject invention relates to methods and apparatus for recording and reproducing video information and, more specifically, to such methods and apparatus wherein theft, unauthorized reproduction and/or unauthorized copying of video recordings are substantially impeded by scrambling and unscrambling techniques.

2. Description of the Prior Art

The problem of theft, unauthorized reproduction and/or unauthorized copying of video recordings has become acute with the proliferation of video recording and/or reproduction equipment.

Unfortunately, video signal scrambling techniques of the type employed in video signal transmission are not suitable to adaptation to the video recording field, as such techniques tend to degrade the recorded and reproduced video signal, render the recording and reproduction equipment too complex and expensive and increase down time and service problems.

With the advent of video tape recorders for passenger entertainment on board of aircraft and similar means of transportation, the problem of tape theft, unauthorized reproduction and/or unauthorized copying of copyrighted or otherwise valuable video recordings has become more acute, as has the need for suitable theft prevention techniques and equipment.

SUMMARY OF THE INVENTION

It is a general object of this invention to overcome the above mentioned disadvantages and satisfy the above mentioned needs.

It is a more specific object of this invention to provide video recording scrambling and unscrambling methods and apparatus for impending theft, unauthorized reproduction and unauthorized copying of video recordings.

It is a related object of this invention to provide relatively simple video recording scrambling and unscrambling methods and apparatus particularly adapted to the typical situation prevailing aboard aircraft and other transportation media.

It is also an object of this invention to exploit every area of utility for which the methods and apparatus herein disclosed are suitable with or without modifications and variations within the spirit and scope of the subject invention.

Other objects will apear in the further course of this disclosure.

From one aspect thereof, the invention resides in a method of scrambling a video information recording of a type having video information and a video information playback synchronization control signal recorded on a recording medium, with said playback control signal being normally in that type of recording recorded in a first track positioned on the recording medium for playback by a specifically positioned playback device in a standard video information playback apparatus for a control of the video information playback, and said video information being normally in said type of recording recorded in a slant-track pattern oriented in a predetermined manner on a recording medium, comprising in combination the steps of recording said video information on one side of said recording medium in said slant-track pattern being oriented in said predetermined manner, and switching the recording of said video information playback control signal on said one side of said recording medium from said first track to a second track different from said first track and spaced from said specifically positioned playback device during playback in said standard video information playback apparatus sufficiently to miss the synchronization control signals playback device if said recorded video information and control signal were attempted to be played back from said medium in a standard video information playback apparatus--;

From another aspect thereof, the invention resides in a method of scrambling a video information recording of a type having video information and a video information playback synchronization control signal recorded on a video recording tape, with said playback control signal being normally in that type of recording recorded in a first track extending parallel to an edge of said recording tape for playback by a specifically positioned playback device in a standard video information playback apparatus for a control of the video information playback, and said video information being normally in said type of recording recorded in a slant-track pattern oriented in a predetermined manner on a recording medium, comprising in combination the steps of recording said video information on said recording tape in said slant-track pattern being oriented in said predetermined manner, and switching the recording of said video information playback control signal on said one side of said recording tape from said first track to a second track spaced from and extending parallel to said first track and spaced from said specifically positioned playback device during playback in said standard video information playback apparatus sufficiently to miss the synchronization control signal playback device if said recorded video information and control signal were attempted to be played back from said medium in a standard video information playback apparatus.

From a further aspect thereof, the invention resides in a method of scrambling a video information recording of a type having video information, a sound accompaniment for said video information, and a video information playback synchronization control signal recorded on a recording medium, with said video information being recorded in a slant-track pattern oriented in a predetermined manner on said recording medium, said playback control signal being normally in that type of recording recorded in a first track positioned on the recording medium for playback by a specifically positioned first playback device in a standard video information playback apparatus, and said sound accompaniment being normally in that type of recording recorded in a second track positioned on the recording medium in spaced relationship to said first track for playback by a specifically positioned second playback device in said standard video information playback apparatus, comprising in combination the steps of recording said video information on one side of said recording medium in said slant-track pattern being oriented in said predetermined manner, recording the video information playback control signal on said one side of said recording medium in said second track, and recording the sound accompaniment for said video information on said recording medium in said first track.

From another aspect thereof, the invention resides in a method of scrambling a video information recording of a type having video information, a sound accompaniment for said video information, and a video information playback synchronization control signal recorded on a video recording tape, with said video information being recorded in a slant-track pattern oriented in a predetermined manner on said recording medium, said playback control signal being normally in that type of recording recorded in a first track extending parallel to an edge of said recording tape for playback by a specifically positioned first playback device in a standard video information playback apparatus, and said sound accompaniment being normally in that type of recording recorded in a second track spaced from and extending parallel to said first track on said recording tape for playback by a specifically positioned second playback device in said standard video information playback apparatus, comprising in combination the steps of recording said video information on one side of said recording tape in said slant-track pattern being oriented in said predetermined manner, recording the video information playback control signal on said one side of said recording tape in said second track, and recording the sound accompaniment for said video information on said recording tape in said first track.

From a further aspect thereof, the invention resides in a method of scrambling and subsequently playing back a video information recording of a type having video information and a video information playback synchronization control signal recorded on a recording medium, with said playback control signal being normally in that type of recording recorded in a first track positioned on the recording medium for playback by a specifically positioned playback device in a standard video information playback apparatus for a control of the video information playback, comprising in combination the steps of recording said video information on one side of said recording medium, rendering playback of said video information from said recording medium by said standard video information playback apparatus impossible by switching the recording of said video information playback control signal on said one side of said recording medium from said first track to a second track spaced from said first track, sufficiently to miss the synchronization control signal playback device if said recorded video information and control signal were attempted to be played back from said medium in a standard video information playback apparatus, providing a second playback device at a location spaced from the position of said specifically positioned playback device by the same distance and in the same direction as said second track is spaced from said first track, playing back said playback control signal from said second track with said second playback device and while said second track is spaced from said first track in the same direction as during said recording of the control signal, playing back said video information, and controlling the playback of said video information with said playback control signal played back from said second track with said second playback device.

From another aspect thereof, the invention resides in a method of scrambling and subsequently playing back a video information recording of a type having video information, a sound accompaniment for said video information, and a video information playback synchronization control signal recorded on a recording medium, with said playback control signal being normally in that type of recording recorded in a first track positioned on the recording medium for playback by a specifically positioned first playback device in a standard video information playback apparatus for a control of the video information playback, and said sound accompaniment being normally in that type of recording recorded in a second track positioned on the recording medium in spaced relationship to said first track for playback by a specifically positioned second playback device in said standard video information playback apparatus, comprising in combination the steps of recording said video information on one side of said recording medium, rendering playback of said video information from said recording medium by said standard video information playback apparatus impossible by recording the video information playback control signal on said one side of said recording medium in said second track with said second track being spaced from said first track sufficiently to miss said first playback device if said recorded video information and control signal were attempted to be played back from said medium in a standard video information playback apparatus, recording the sound accompaniment for said video information on said recording medium in said first track providing said second playback device at a location spaced from the position of said specifically positioned playback device by the same distance and in the same direction as said second track is spaced from said first track, playing back said playback control signal from said second track with said second playback device and while said second track is spaced from said first track in the same direction as during said recording of the control signal, playing back said video information, playing back said sound accompaniment from said first track, and controlling the playback of said video information with said playback control signal played back from said second track with said second playback device.

From a further aspect thereof, the invention resides in a method of scrambling and subsequently playing back a video information recording of a type having video information and a video information playback synchronization control signal recorded on a recording medium located in a casing, with said playback control signal being normally in that type of recording recorded in a first track positioned on the recording medium for playback by a specifically positioned playback device in a standard video information playback apparatus for a control of the video information playback, comprising in combination the steps of recording said video information on one side of said recording medium, rendering playback of said video information from said recording medium by said standard video information playback apparatus impossible by switching the recording of said video information playback control signal on said one side of said recording medium from said first track to a second track spaced from said first track sufficiently to miss the synchronization control signal playback device if said recorded video information and control signal were attempted to be played back from said medium in a standard video information playback apparatus, providing on said casing a confidential indication that the video information playback control signal is recorded in said second track different from said first track, providing a second playback device at a location spaced from the position of said specifically positioned playback device by the same distance and in the same direction as said second track is spaced from said first track playing back said playback control signal from said second track playing back said video with said second playback device and while said second track is spaced from said first track in the same direction as during said recording of the control signal video information, sensing said confidential indication on said casing, and controlling the playback of said video information with said played-back playback control signal in response to said sensing of the confidential indication.

From yet another aspect thereof, the invention resides in a method of scrambling and subsequently playing back a video information recording of a type having video information, a sound accompaniment for said video information, and a video information playback synchronization control signal recorded on a recording medium located in a casing, with said playback control signal being normally in that type of recording recorded in a first track positioned on the recording medium for playback by a specifically positioned first playback device in a standard video information playback apparatus for a control of the video information playback, and said sound accompaniment being normally in that type of recording recorded in a second track positioned on the recording medium in spaced relationship to said first track for playback by a specifically positioned second playback device in said standard video information playback apparatus, comprising the steps of recording said video information on one side of said recording medium, rendering playback of said video information from said recording medium by said standard video information playback apparatus impossible by recording the video information playback control signal on said one side of said recording medium in said second track with said second track being spaced from said first track sufficiently to miss said first playback device if said recorded video information and control signal were attempted to be played back from said medium in a standard video information playback apparatus, recording the sound accompaniment for said video information on said recording medium in said first track, providing on said casing a confidential indication that the video information playback control signal is recorded in said second track, providing said second playback device at a location spaced from the position of said specifically positioned playback device by the same distance and in the same direction as said second track is spaced from said first track, playing back said playback control signal from said second track with said second playback device and while said second track is spaced from said first track in the same direction as during said recording of the control signal, playing back said video information, playing back said sound accompaniment from said first track, sensing said confidential indication on said casing, and controlling the playback of said video information with said played-back playback control signal in response to said sensing of the confidential indication.

From yet another aspect thereof, the invention resides in apparatus for playing back video information from a regular recording having video information recorded on a first recording medium and a first video information playback control signal recorded in a first recording track on said first recording medium for playback by a first playback device, and for alternatively playing back video information from a scrambled recording having video information recorded on a second recording medium and a second video information playback control signal recorded in a second recording track on said second recording medium, with said second recording track on said second recording medium being spaced from any recording track on said second recording medium which would positionally correspond to said first recording track and being so spaced sufficiently to miss said first playback device upon playback of said scrambled recording. The invention according to the latter aspect resides, more specifically, in the improvement comprising, in combination, means for playing back said video information from said first recording medium and alternatively from said second recording medium, means including said first playback device for playing back said first control signal, means for playing back said second control signal including a second playback device spaced from said first playback device by the same distance and in the same direction as said second recording track is spaced from said positionally corresponding recording track, means connected to said video information playback means for controlling said video information playback means with said first control signal during playback of video information from said first recording medium, and for controlling said video information playback means with said second control signal during playback of video information from said second recording medium, and means connected to said first and second control signal playback means and said means for controlling said video information playback means for applying said first control signal to said controlling means in a first state, and for alternatively applying said second control signal to said controlling means in a second state of said applying means.

From a further aspect thereof, the invention resides in apparatus for playing back video information from a regular recording having video information recorded on a first recording medium, a first video information playback control signal recorded in a first recording track on said first recording medium, and a first video information sound accompaniment recorded in a second recording track on said first recording medium, and for alternatively playing back video information from a scrambled recording having video information recorded on a second recording medium, a second video information sound accompaniment recorded in a first recording track on said second recording medium, said first recording track on said second recording medium corresponding positionally to said first recording track on said first recording medium, and a second video information playback control signal recorded in a second recording track on said second recording medium, said second recording track on said second recording medium corresponding positionally to said second recording track on said first recording medium. The invention according to the latter aspect resides, more specifically, in the improvement comprising, in combination, means for playing back said video information from said first recording medium and alternatively from said second recording medium, means for playing back said first video information sound accompaniment from said second recording track on said first recording medium and for alternatively playing back said second video information sound accompaniment from said first recording track on said second recording medium, means for playing back said first control signal from said first recording track on said first recording medium, means for playing back said second control signal from said second recording track on said second recording medium, means connected to said video information playback means for controlling said video information playback means with said first control signal during playback of video information from said first recording medium, and for controlling said video information playback means with said second control signal during playback of video information from said second recording medium, and means connected to said first and second control signal playback means and said means for controlling said video information playback means for applying said first control signal to said controlling means in a first state, and for alternatively applying said second control signal to said controlling means in a second state of said applying means.

BRIEF DESCRIPTION OF THE DRAWINGS

The invention will become more readily apparent from the following detailed description of preferred embodiments thereof, illustrated by way of example in the accompanying drawings, in which like reference numerals designate like or functionally equivalent parts, and in which:

FIGS. 2 and 3 are diagrammatic elevational views of a recording tape, and of associated control signal and audio equipment in accordance with a preferred embodiment of the subject invention;

FIG. 4 is a view similar to FIGS. 2 and 3 illustrating scrambled playback of a video recording;

FIGS. 5 and 6, when juxtaposed as shown in FIG. 7, jointly constitute a circuit diagram of a servo control which may be used in practicing the subject invention.

DESCRIPTION OF PREFERRED EMBODIMENTS

Figure 1:
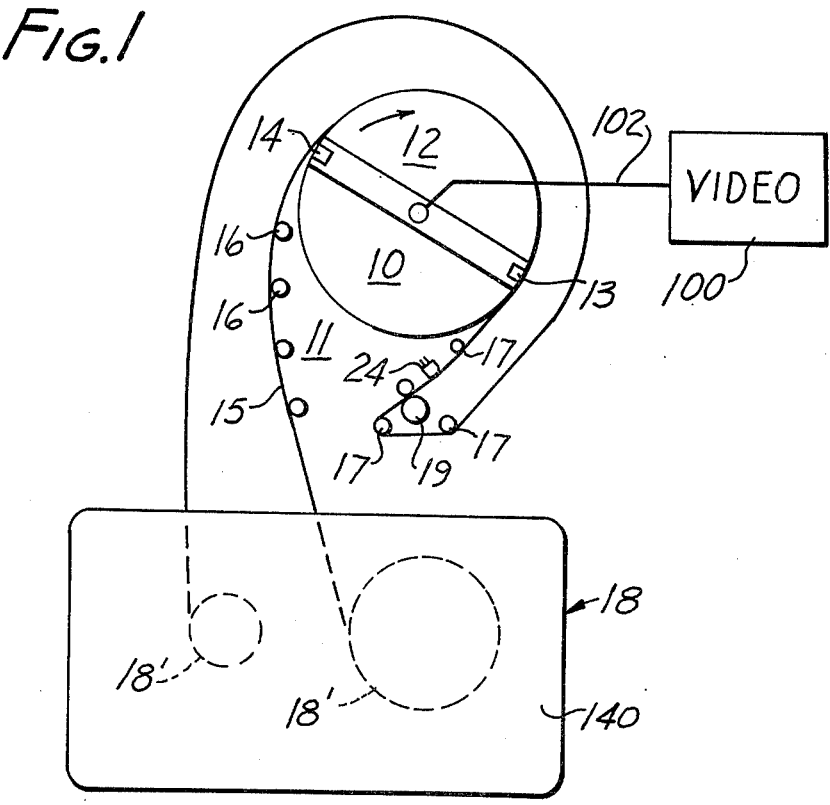
FIG. 1 is a diagrammatic top view of essential parts of a video tape recording and playback apparatus with which the subject invention may be practiced.

In order to disclose the subject invention within the framework of one of its possible settings and in order to set forth the best mode presently contemplated of carrying out this invention, the subject matter of FIGS. 1 and 2 has been developed with reference to the videocassette recorder type VO-1600, manufactured by Sony Corporation. In this connection, reference may, for instance, be had to the Sony Service Manual VO-1600, published 1972.

FIG. 1 diagrammatically shows a head drum assembly 10 of a video tape recording and reproducing apparatus 11. The head drum assembly 10 has a rotary support 12 for a pair of video recording and playback heads 13 and 14. Recording tape 15 from a tape cassette 18 or other tape supply and takeup means (not shown) is guided by rollers 16 to the head drum assembly and by rollers 17 from the head drum assembly. Some of these rollers may be part of conventional tape threading equipment as, for instance, disclosed in the above mentioned Service Manual. For more details on the head drum assembly 10 and tape cassette 18, reference may be had to U.S. Pat No. 3,740,492, by Katsu Inaga, issued June 19, 1973, which is herewith incorporated by reference herein. Other suitable head drum assembly and cassette systems are disclosed in the following U.S. Pats. Nos. herewith incorporated by reference herein: 3,643,038, by Seiji Sato, issued Feb. 15, 1972; 3,660,614, by Swain et al, issued May 2, 1972; 3,665,114, by Richard A. Hathaway, issued May 23, 1972; 3,665,120, by Thomas J. Larkin, issued May 23, 1972; 3,673,348, by Thomas J. Larkin, issued June 27, 1972; and 3,681,539, by Walter Eibensteiner, issued Aug. 1, 1972.

The head support 12 and heads 13 and 14 are rotated by a conventional drive (not shown). The tape 15 is partially withdrawn from the cassette 18 and loaded on the head drum assembly 10 and is then advanced by a nip roller and capstan assembly 19 which is also driven by conventional means (not shown). The cassette 18 typically houses two tape reels 18' or similar tape winding devices.

As is well known in the video recording art, equipment of the type shown in FIG. 1 records the video signal in a slant-track pattern oriented in a predetermined manner on the video tape 15 as seen in FIGS. 2 to 4. By way of example, such a slant-track pattern for the video information is shown at 21 in FIGS. 2, 3 and 4.

In this type of video recorder, it is also customary to record signals for control purposes on the tape. This is customarily done in a separate control track. Similarly, one or more audio accompaniments are recorded in one or more audio tracks. These control and audio tracks are typically linear. A control and audio signal recording and playback head assembly 24 is shown in FIG. 1 to 4.

In particular, the illustrated head assembly 24 has a first recording and playback device or head 25, a second recording and playback device or head 26, and a third recording and playback device or head 27. By way of example and not by way of limitation, the tape 15 may be a magnetic recording tape and the heads 13, 14, 25, 26, and 27 may be magnetic recording and playback heads. In that case, it is customary to associate a magnetic erase head (not shown) with the tape 15 for erasing any recorded information therefrom.

Control signals are either generated by a servo control 20 for recording in the control signal track in the recording mode of the equipment, or are processed by the servo control 20 in the playback mode of the equipment.

Figure 5:
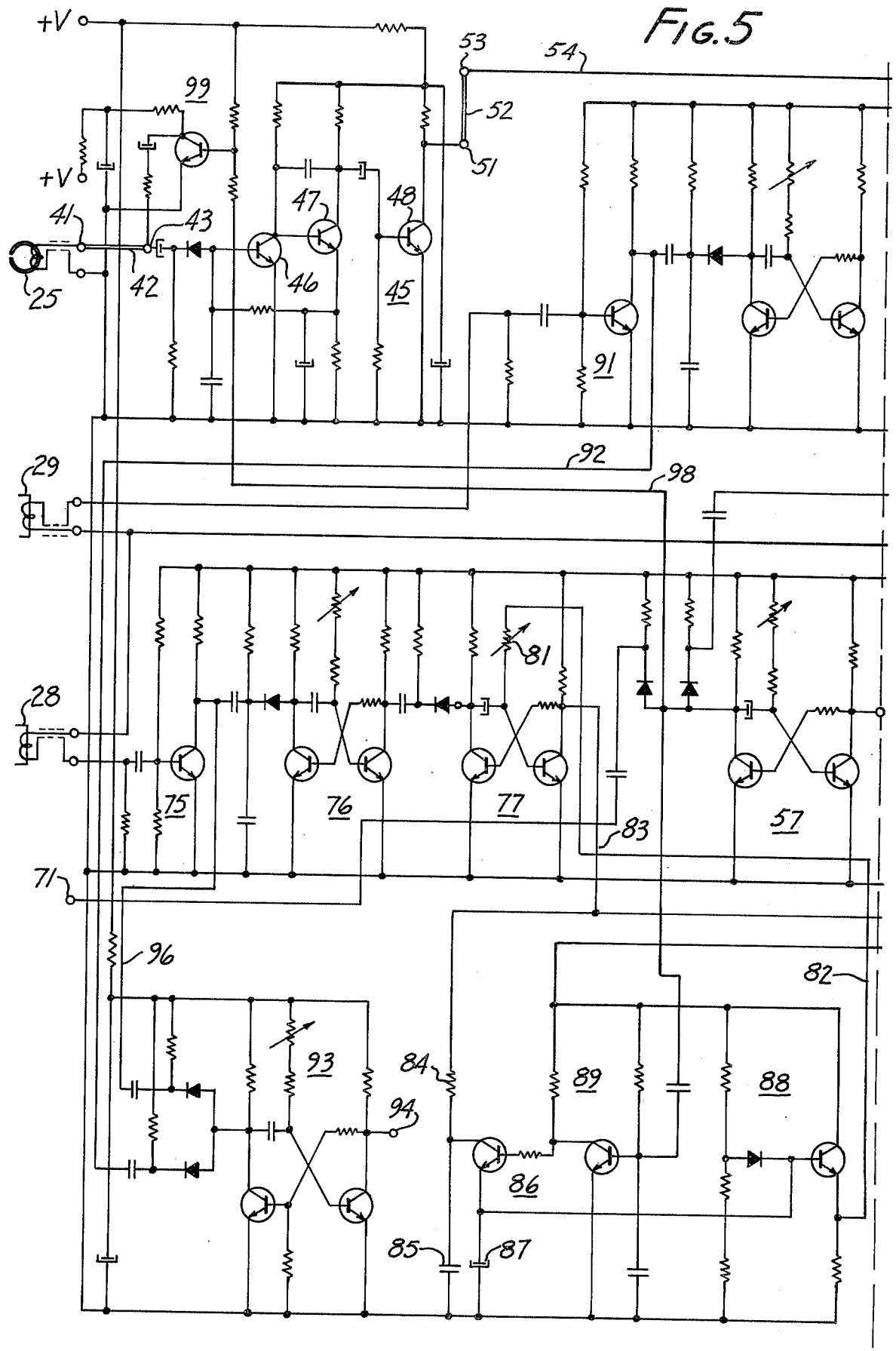

A representative type of servo control 20 for the above mentioned type of video recording and playback equipment is shown by way of example in FIGS. 5 and 6 which should be juxtaposed as shown in FIG. 7. In this connection, reference may again be had to the above mentioned Service Manual or videocassette recorder.

By way of general comment, the recording and playback equipment herein under consideration employs a braking-type servo system to control the velocity of the video recording and playback head rotation. In addition to the control signal recording and playback head 24 shown in FIGS. 1 and 2, there are two further magnetic pickup devices 28 and 29 shown below the control signal head 24 in FIG. 2.

The devices 28 and 29 pick up the position of the video heads 13 and 14, respectively. These pickup devices are of a conventional type and, in a conventional manner, generate a pulse whenever they are passed by a magnetically active vane or other rotating conventional device (not shown) which is located on the rotating head assembly to indicate video head position.

Upon playback, the servo control shown in FIGS. 5 and 6 compares the control signals played back by the head 25 with the signals generated by the pickup devices 28 and 29. If this comparison indicates that the video head velocity is too high, the braking current in a conventional braking device 31 is increased so as to retard the video head position. On the other hand, the braking current is lessened in response to an indication that the video heads 13 and 14 lag the desired velocity.

In the recording mode, separated sync signals obtained from the video signals serve as timing reference for the illustrated servo system.

In the servo control shown in FIGS. 5 and 6, a terminal 41, jumper 42 and terminal 43 connect the control signal head 25 to a preamplifier 45 including transistors 46, 47 and 48. The output pulses of the preamplifier 45 are applied via terminal 51, jumper 52 and terminal 53 to a lead 54.

When a tracking control switch 56 shown in FIG. 6 is in its off position, the output pulses of the preamplifier 45 are applied to a monostable multivibrator 57. These output pulses are also applied to a multivibrator 58 of a variable delay system that provides variable tracking. This variable delay system includes the multivibrator 58 and a multivibrator 59 connected in cascade. The RC network that determines the duration of the unstable state of the multivibrator 59 is returned to a variable bias source at a transistor 61, whose emitter voltage is controlled by a voltage divider that includes the variable resistor 62 of a tracking control.

In the on position of the tracking control switch 56, delayed played-back tracking control pulses are applied to the above mentioned multivibrator 57. This multivibrator generates a pulse to be formed into a sampling ramp in the succeeding stage. The multivibrator 57 is connected to a Miller integrator 63 that generates a negative-going ramp. The amplitude of this ramp is sampled by sampling hold gate 64 which is turned on by a delayed pulse generated by the pickup device 28 upon each pass made by the video head 13. A capacitor 65 is charged to the value of the ramp and holds its charge until the next pulse is picked up.

In this manner, the voltage stored across the capacitors 65 is determined by instantaneous head position. If the video heads are early, the ramp is sampled at a higher amplitude and the voltage across the capacitor 65 increases.

This, in turn, will result in increased braking current generated by a power amplifier 66 which includes transistors 67, 68 and 69 which is connected to the sampling hold gate 64.

In the playback mode, the servo system reaches equilibrium when the video heads 13 and 14 track precisely over the prerecorded tracks 21 on the tape 15.

In the operation of the system, an amplifier 74 amplifies the delayed head position pulse to drive the sampling hold gate 64. The transistors 67 and 68 are connected in a Darlington configuration to prevent loading of the sampling hold capacitor 65. The transistor 69 provides the brake current.

The brake 31 may operate as a squirrel cage motor with a stationary field. An increase in the braking current acts to brake the rotor that is secured to the shaft of the rotary head drum assembly.

The pulses generated by the head position pickup 28 are amplified at 75 and are applied to a pair of delay multivibrators 76 and 77. The multivibrator 77 is set to place the delayed head position pulse at the correct position on the sampling ramp.

The latter position is adjusted with the aid of a variable resistor 81 which receives a variable voltage signal via a lead 82. The voltage of the latter signal is determined by a closed loop system that acts to integrate jitter in the playback control track pulses due to residual vow and flutter in the tape transport.

To this effect, a pulse is derived from the multivibrator 77 by a lead 83 and is integrated by a resistor 84 and a capacitor 85. The integrated pulse is applied as a steep ramp to a sampling hold gate 86. This gate is switched on by the control track pulse found at the input of the multivibrator 57.

In consequence, a capacitor 87 is charged and stores a direct-current signal proportional to control track pulse jitter. The capacitor 87 is quite large so that the jitter component is integrated over a long time interval.

The voltage across the capacitor 87 is buffered at 88 to control the delay of the head position indicating pulses in the multivibrator 77 via the lead 82. The requisite sampling hold pulse is amplified at 89.

In this manner, head position indicating pulses are delayed to coincide with the average position of the control track pulses and the effects of rapid jitter are minimized.

The head position pickup 29 is mounted 180° from the pickup 28 and serves to generate a pulse as the video head 14 enters the tape path. This pulse may be used in a conventional manner to trigger head switching equipment (not shown) and to generate the blanking pulse for a conventional dropout compensator (not shown).

To this end, the output of the pulse amplifier 91 is applied by a lead 92 to a delay and dropout compensator multivibrator 93 which controls video head switching and, at an output 94, generates a 60 Hz blanking pulse that disables the dropout compensator during the head switching interval.

It will be noted that a lead 96 applies pulses derived from the pickup 28 to a second input of the multivibrator 93.

In the recording mode of the illustrated equipment, vertical sync signals or other synchronization signals are derived from the video signal being recorded by a sync stripper 70 or other synchronization signal deriving equipment, and are applied via an input terminal 71 to trigger the multivibrator 57 of the ramp generator.

The resulting control signal pulses are applied via the lead 98 to a recording amplifier 99, and the amplified control signals are applied via the terminals 41 and 43 and jumper 42 to the control signal recording head 25 for recording in a control track on the tape 15.

By way of example, in a servo system of the type so far described, control pulses are typically recorded in the control signal track at 33 ms intervals. Upon playback, the servo system employs the control pulses to control the video signals playback operation in the above mentioned manner. These control pulses may, therefore, be referred to as "video information playback control signals."

In addition to the servo control 20, the equipment under consideration also includes video signal generating, processing and display equipment 100 indicated in FIG. 1, and audio equipment 101 shown in FIGS. 2 to 4.

By way of example, the video equipment 100 may include a video camera and/or an off-the-air television or video receiver, as well as a television or video display device together with all those synchronizing and other circuits as are customarily associated with video signal generation, reception, recording and display. The video equipment 100 as such may be of a coventional type and applies synchronized video signals to the recording heads 13 and 14, and receives played-back synchronized video signals from the recording heads 13 and 14, via a line 102.

The audio equipment serves to provide an audio accompaniment for the video information and may be of a monaural or of a stereophonic type. By way of example, FIGS. 2 to 4 illustrate audio equipment 101 of a stereophonic type, having apparatus 105 for processing the right stereo channel and apparatus 106 for processing the left stereo channel.

The audio equipment 101 may be of a conventional type, including amplifier equipment, microphones, radio broadcast receivers or audio circuits of television receivers, loudspeakers, headphone systems and other conventional audio equipment.

In the type of recording equipment and video recording under consideration, it is customary or normal to record the video information playback control signal in a specific or first track positioned on the recording tape 15 for playback by a specifically positioned playback device in a standard video information playback apparatus.

In particular, since the device or head 25 is a control signal recording and playback device or head, as far as its dedication in the above mentioned standard video information recording and playback equipment is concerned, the playback control signal supplied by the servo control 20 would normally be recorded by the recording head 25 in the track 112 of the tape 15, extending parallel to an edge thereof. In terms of standard equipment, it may thus be said that the head 25 is specifically positioned, relative to the tape 15 or to the audio heads 26 and 27, for recording of the control signal onto and from the first track 112 on the tape 15. In FIGS. 2 to 4, the recorded control signal is symbolically illustrated by a series of vertical lines 113.

Similar considerations apply to the recorded audio signals. In particular, the audio signals recording and playback head 26 in the above mentioned standard type of equipment is positioned relative to the recording tape 15 or the control signal recording head 25 so as to record the right-channel audio signal in a second track 115 shown in FIGS. 2 to 4. Symbolically, the right-channel audio signal is indicated by a series of lines 116 slanting from the right to the left as seen from the top to the bottom of each line 116.

In the standard type of machine under consideration, the audio recording and playback head 27 is so positioned relative to the tape 15 or head 25 and 26 as to record the left-channel of the audio signal in a third recording track 118 which, like the track 115, is spaced from and extends parallel to the first track 112 and to either edge of the tape 15. The left-channel audio signal, supplied by the equipment 106 is indicated in the illustration of the third channel 118 in FIGS. 2 to 4 by a series of lines 119 slanted from the left to the right as seen from the top to the bottom of each line 119.

The video recording and playback equipment according to the preferred embodiment of the subject invention illustrated in FIGS. 2 and 3 has a switch arrangement 121 including ganged switches 122 and 123. These switches may, for instance, be manually, electromechanically, electromagnetically, or mechanically operated double-throw switches.

The switch 122 serves as a means for alternatively connecting the recording and playback heads 25 and 26 to the servo control 20. The switch 123, in turn, serves as a means for alternatively connecting the recording and playback heads 26 and 25 to the right-channel audio equipment 105 of the audio system 101.

In particular, in the position illustrated by a solid line in FIG. 2, the switch 122 interconnects the servo control 20 and the head 25.

In that identical position, the ganged switch 123 interconnects the head 26 and audio equipment 105. Accordingly, the control signal 113 and both of the audio signals 116 and 119 are recorded and played back in the switch position of FIG. 2 in the same manner as in a conventional or standard video recording and playback apparatus of the above mentioned type.

On the other hand, if the ganged switches 122 and 123 are in their alternative positions shown in FIG. 3, then the switch 122 interconnects the servo control 20 and the recording and playback head 26, while the switch 123 interconnects the recording and playback head 25 and the audio equipment 105. As a result, the video playback control signal 113 is now recorded in the second recording track 115, while the right-channel audio signal 116 is now recorded in the first track 112. As seen in FIGS. 2 to 4, the video signals and video playback control signals are always recorded on the same side of the magnetic recording medium or tape.

In this manner, the video information recording is being scrambled. The expression "scrambling" is employed in this connection in the sense of "modifying so as to make unintelligible without special receiving equipment." It will be noted in this respect, that the video signal as such, recorded in the slant tracks 21 oriented in the same predetermined manner in this scrambled version of FIGS. 3 and 4 as in the unscrambled version of FIG. 2, is not scrambled, but that the scrambling or element of unintelligibility without special receiving equipment resides in the relative switching of the control signal record with at least one of the audio signal records whereby the second recording track 115 in which the video playback control signal 113 is recorded as described in the preceding paragraph and as shown in FIG. 3 is spaced from the first track sufficiently to miss the synchronization control signal playback device 25 if the recorded video information 21 and control signal 113 shown in FIG. 4 were attempted to be played back from the medium or tape 15 in a standard video playback apparatus as described below and shown in FIG. 4.

In practice, this has proved to a very effective form of video information record scrambling, as may be seen with reference to FIG. 4.

In particular, FIG. 4 shows the heads 25, 26 and 27 connected in the conventional manner in the type of standard equipment mentioned above. Accordingly, a line 131 connects the head 25 to the control 20. A line 132 connects the head 26 to the audio equipment 105, and a line 133 connects the head 26 to the audio equipment 106.

In consequence, the standard type of apparatus shown in FIG. 4 will apply the played-back audio signal 116 to the control 20. In this manner, the servo control 20 is prevented from functioning properly, as the servo control is unable to control the video signal playback process without reception of the control signal 113. That control signal, on the other hand, is according to FIG. 4, applied to the audio equipment 105 where it is either silent when its frequency is in the supra-audible range, or produces an unpleasant, barking noise reminiscent of the sound accompanying some types of prior-art scrambled video signals, when its frequency is in the audible range.

In order to intelligibly reproduce or "unscramble" the scrambled video recording, the equipment and switch position shown in FIG. 3 are employed, whereby the control signal 113 is played back from the second recording track 115 by the head 26 which as seen in the drawings is situated at a location spaced from the position of the head 25 by the same distance and in the same direction as the second track 115 is spaced from the first track 112, while the second track 115 during playback remains spaced from the first track 112 in the same direction as during the switched recording described above and shown in FIG. 3. The control signal thus played back from the second track 115 with the head 26 is applied via the switch 122 to the servo control 20, while the audio signal 116 is played back by the head 25 and is applied via the switch 123 to the audio equipment 105 for a normal reproduction and display of the sound-accompanied video recording played-back from the tape 15 with the type of equipment shown in FIGS. 1 and 3.

It will thus be recognized that the equipment according to the preferred embodiment of the subject invention illustrated in FIGS. 1 to 3 is capable of playing back both a standard type of video recording as illustrated in FIG. 2 and a scrambled type of video recording as illustrated in FIG. 3. When playing back a standard type of video recording, the switches 122 and 123 are in their positions as solidly illustrated in FIG. 2. On the other hand, when playing back a scrambled video recording, the switches 122 and 123 are in their positions as illustrated in FIG. 3.

If the control signal 113 of a standard recording shown in FIG. 2 is designated as a first control signal, then the head 23 may be seen as a means for playing back that first control signal while the switch 122 then operates as a means for applying that first control signal to the servo control 20 in a first state.

Similarly, if the control signal 113 of the scrambled recording shown in FIG. 3 is considered a second control signal, then the head 26 may be viewed as a means for playing back that second control signal, while the switch 122, in its second state illustrated in FIG. 3, may then be viewed of applying that second signal to the servo control 20.

In accordance with a further preferred embodiment of the subject invention, a confidential indication is provided with respect to the type of recording shown in FIG. 3, so as to identify that recording as a scrambled recording. Further in accordance with that preferred embodiment, the switches 122 and 123 or equivalent means may then be positioned in response to a sensing of that confidential indication so as to unscramble the recording in the manner disclosed above in connection with FIG. 3.

More specifically, the video tape cassette 18 may have a casing 140 on which the mentioned confidential indication may be provided, and from which that confidential indication may be sensed.

Figure 8:
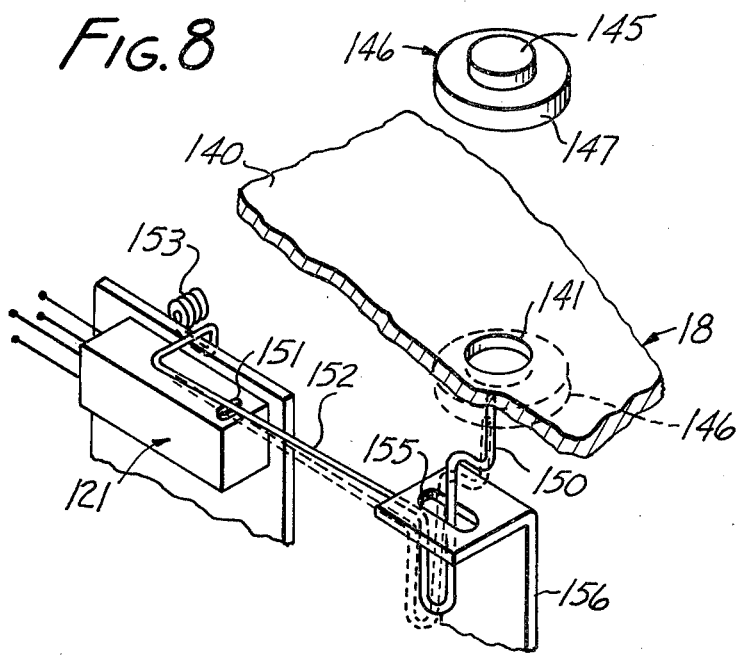
FIG. 8 is a perspective view of scrambled condition sensing equipment in accordance with a further preferred embodiment of the subject invention.

By way of example, the cassette casing 140 has an aperture 141 for receiving the shank or shaft portion 145 of a plug 146 having an increased diameter head 147. As shown in FIG. 8, the plug 146 may either be removed from the casing 140 or may alternatively be attached to the casing 140 by inserting its shank portion 145 into the aperture 141. The switch assembly 121 shown in FIGS. 2 and 3 may have the form illustrated in FIG. 8 wherein a common actuator 151 for the switches 122 and 123 shown in FIGS. 2 and 3 is, in turn, actuated by a wire 152 which is pivoted and spring biased at 153 at one end thereof, and which extends through an aperture 154 in a bracket 156 at an opposite end thereof.

A free end 158 extends in the proximity of the casing aperture 141 when the video cassette 18 is located for a recording or playback operation.

If the plug 146 is removed from the cassette casing 140, then the sensing wire 152 remains in its solidly illustrated position, whereby the switches 122 and 123 are in their positions illustrated by solid lines in FIG. 2. In that case, the video equipment will record and reproduce standard or unscrambled video information recordings.

On the other hand, if the plug 146 is attached to the cassette casing 140 in the manner illustrated by dotted lines at 146 in FIG. 8, then the head 147 of the plug 146 will depress the sensing wire 152 to the position illustrated in dotted lines for that sensing of wires, whereby the switches 122 and 123 will be moved to their positions illustrated in FIG. 3 when the video cassette is inserted for a recording or playback operation of a scrambled video information recording.

If desired, the switches 122 and 123 may be part of an electromagnetic relay which is energized by a switch of the type shown at 121 in FIG. 8. Also, the indicating and sensing function of the type shown in FIG. 8 may, if desired, be combined with the type of indicating and sensing function employed in the above mentioned type of conventional video equipment with respect to recording operations as distinguished from mere playback operations.

In either case, the subject invention renders both heads 25 and 26 common to both the control signal recording and playback means and the audio rcording and playback means.

Various modifications and variations within the spirit and scope of the subject invention are rendered apparent or suggest themselves by the subject extensive disclosure to those skilled in the art.

I claim:

1. A method of scrambling a video information recording of a type having video information and a video information playback synchronization control signal recorded on a recording medium, with said playback control signal being normally in that type of recording recorded in a first track positioned on the recording medium for playback by a specifically positioned playback device in a standard video information playback apparatus for a control of the video information playback, and said video information being normally in that type of recording recorded in a slant-track pattern oriented in a predetermined manner on said recording medium, comprising in combination the steps of:

recording said video information on one side of said recording medium in said slant-track pattern being oriented in said predetermined manner; and switching the recording of said video information playback control signal on said one side of said recording medium from said first track to a second track different from said first track and spaced from said specifically positioned playback device during playback in said standard video information playback apparatus sufficiently to miss the synchronization control signal playback device if said recorded video information and control signal were attempted to be played back from said medium in a standard video information playback apparatus.

2. A method of scrambling a video information recording of a type having video information and a video information playback synchronization control signal recorded on a video recording tape, with said playback control signal being normally in that type of recording recorded in a first track extending parallel to an edge of said recording tape for playback by a specifically positioned playback device in a standard video information playback apparatus for a control of the video information playback, and said video information being normally in said type of recording recorded in a slant-track pattern oriented in a predetermined manner on a recording medium, comprising in combination the steps of:

recording said video information on one side of said recording tape in said slant-track pattern being oriented in said predetermined manner; and switching the recording of said video information playback control signal on said one side of said recording tape from said first track to a second track spaced from and extending parallel to said first track and spaced from said specifically positioned playback device during playback in said standard video information playback apparatus sufficiently to miss the synchronization control signal playback device if said recorded video information and control signal were attempted to be played back from said medium in a standard video information playback apparatus.

3. A method of scrambling a video information recording of a type having video information, a sound accompaniment for said video information, and a video information playback synchronization control signal recorded on a recording medium, with said video information being recorded in a slant-track pattern oriented in a predetermined manner on said recording medium, said playback control signal being normally in that type of recording recorded in a first track positioned on the recording medium for playback by a specifically positioned first playback device in a standard video information playback apparatus, and said sound accompaniment being normally in that type of recording recorded in a second track positioned on the recording medium in spaced relationship to said first track for playback by a specifically positioned second playback device in said standard video information playback apparatus, comprising in combination the steps of:

recording said video information on one side of said recording medium in said slant-track pattern being oriented in said predetermined manner;

recording the video information playback control signal on said one side of said recording medium in said second track; and recording the sound accompaniment for said video information on said recording medium in said first track.

4. A method of scrambling a video information recording of a type having video information, a sound accompaniment for said video information, and a video information playback synchronization control signal recorded on a video recording tape, with said video information being recorded in a slant-track pattern oriented in a predetermined manner on said recording medium, said playback control signal being normally in that type of recording recorded in a first track extending parallel to an edge of said recording tape for playback by a specifically positioned first playback device in a standard video information playback apparatus, and said sound accompaniment being normally in that type of recording recorded in a second track spaced from and extending parallel to said first track on said recording tape for playback by a specifically positioned second playback device in said standard video information playback apparatus, comprising in combination the steps of:

recording said video information on one side of said recording tape in said slant-track pattern being oriented in said predetermined manner;

recording the video information playback control signal on said one side of said recording tape in said second track; and recording the sound accompaniment for said video information on said recording tape in said first track.

5. A method of scrambling and subsequently playing back a video information recording of a type having video information and a video information playback synchronization control signal recorded on a recording medium, with said playback control signal being normally in that type of recording recorded in a first track positioned on the recording medium for playback by a specifically positioned playback device in a standard video information playback apparatus for a control of the video information playback, comprising in combination the steps of:

recording said video information on one side of said recording medium;

rendering playback of said video information from said recording medium by said standard video information playback apparatus impossible by switching the recording of said video information playback control signal on said one side of said recording medium from said first track to a second track spaced from said first track sufficiently to miss the synchronization control signal playback device if said recorded video information and control signal were attempted to be played back from said medium in a standard video information playback apparatus;

providing a second playback device at a location spaced from the position of said specifically positioned playback device by the same distance and in the same direction as said second track is spaced from said first track;

playing back said playback control signal from said second track with said second playback device and while said second track is spaced from said first track in the same direction as during said recording of the control signal;

playing back said video information; and controlling the playback of said video information with said playback control signal played back from said second track with said second playback device.

6. A method as claimed in claim 5, wherein:

said type of video information recording has video information normally recorded in a slant-track pattern being oriented in a predetermined manner on the recording medium; and said video information is recorded on said recording medium in said slant-track pattern being oriented in said predetermined manner.

7. A method of scrambling and subsequently playing back a video information recording of a type having video information, a sound accompaniment for said video information, and a video information playback synchronization control signal recorded on a recording medium, with said playback control signal being normally in that type of recording recorded in a first track positioned on the recording medium for playback by a specifically positioned first playback device in a standard video information playback apparatus for a control of the video information playback, and said sound accompaniment being normally in that type of recording recorded in a second track positioned on the recording medium in spaced relationship to said first track for playback by a specifically positioned second playback device in said standard video information playback apparatus, comprising in combination the steps of:

recording said video information on one side of said recording medium;

rendering playback of said video information from said recording medium by said standard video information playback apparatus impossible by recording the video information playback control signal on said one side of said recording medium in said second track with said second track being spaced from said first track sufficiently to miss said first playback device if said recorded video information and control signal were attempted to be played back from said medium in a standard video information playback apparatus;

recording the sound accompaniment for said video information on said recording medium in said first track;

providing said second playback device at a location spaced from the position of said specifically positioned playback device by the same distance and in the same direction as said second track is spaced from said first track;

playing back said playback control signal from said second track with said second playback device and while said second track is spaced from said first track in the same direction as during said recording of the control signal;

playing back said video information;

playing back said sound accompaniment from said first track; and controlling the playback of said video information with said playback control signal played back from said second track with said second playback device.

8. A method as claimed in claim 7, wherein:

said type of video information recording has video information normally recorded in a slant-track pattern being oriented in a predetermined manner on the recording medium; and said video information is recorded on said recording medium in said slant-track pattern being oriented in said predetermined manner.

9. A method of scrambling and subsequently playing back a video information recording of a type having video information and a video information playback synchronization control signal recorded on a recording medium located in a casing, with said playback control signal being normally in that type of recording recorded in a first track positioned on the recording medium for playback by a specifically positioned playback device in a standard video information playback apparatus for a control of the video information playback, comprising in combination the steps of:

recording said video information on one side of said recording medium;

rendering playback of said video information from said recording medium by said standard video information playback apparatus impossible by switching the recording of said video information playback control signal on said one side of said recording medium from said first track to a second track spaced from said first track sufficiently to miss the synchronization control signal playback device if said recorded video information and control signal were attempted to be played back from said medium in a standard video information playback apparatus;

providing on said casing a confidential indication that the video information playback control signal is recorded in said second track different from said first track;

providing a second playback device at a location spaced from the position of said specifically positioned playback device by the same distance and in the same direction as said second track is spaced from said first track;

playing back said playback control signal from said second track with said second playback device and while said second track is spaced from said first track in the same direction as during said recording of the control signal;

playing back said video information, sensing said confidential indication on said casing; and controlling the playback of said video information with said played-back playback control signal in response to said sensing of the confidential indication.

10. A method as claimed in claim 9, wherein:

said type of video information recording has video information normally recorded in a slant-track pattern being oriented in a predetermined manner on the recording medium; and said video information is recorded on said recording medium in said slant-track pattern being oriented in said predetermined manner.

11. A method of scrambling and subsequently playing back a video information recording of a type having video information, a sound accompaniment for said video information, and a video information playback synchronization control signal recorded on a recording medium located in a casing, with said playback control signal being normally in that type of recording recorded in a first track positioned on the recording medium for playback by a specifically positioned first playback device in a standard video information playback apparatus for a control of the video information playback, and said sound accompaniment being normally in that type of recording recorded in a second track positioned on the recording medium in spaced relationship to said first track for playback by a specifically positioned second playback device in said standard video information playback apparatus, comprising the steps of:

recording said video information on one side of said recording medium, rendering playback of said video information from said recording medium by said standard video information playback apparatus impossible by recording the video information playback control signal on said one side of said recording medium in said second track with said second track being spaced from said first track sufficiently to miss said first playback device if said recorded video information and control signal were attempted to be played back from said medium in a standard video information playback apparatus;

recording the sound accompaniment for said video information on said recording medium in said first track;

providing on said casing a confidential indication that the video information playback control signal is recorded in said second track;

providing said second playback device at a location spaced from the position of said specifically positioned playback device by the same distance and in the same direction as said second track is spaced from said first track;

playing back said playback control signal from said second track with said second playback device and while said second track is spaced from said first track in the same direction as during said recording of the control signal;

playing back said video information;

playing back sound accompaniment from said first track;

sensing said confidential indication on said casing; and controlling the playback of said video information with said played-back control signal in response to said sensing of the confidential indication.

12. A method as claimed in claim 11, wherein:

said type of video information recording has video information normally recorded in a slant-track pattern being oriented in a predetermined manner on the recording medium; and said video information is recorded on said recording medium in said slant-track pattern being oriented in said predetermined manner.

13. In apparatus for playing back video information from a regular recording having video information recorded on a first recording medium and a first video information playback control signal recorded in a first recording track on said first recording medium for playback by a first playback device, and for alternatively playing back video information from a scrambled recording having video information recorded on a second recording medium and a second video information playback control signal recorded in a second recording track on said second recording medium, with said second recording track on said second recording medium being spaced from any recording track on said second recording medium which would positionally correspond to said first recording track and being so spaced sufficiently to miss said first playback device upon playback of said scrambled recording, the improvement comprising in combination:

means for playing back said video information from said first recording medium and alternatively from said second recording medium;

means including said first playback device for playing back said first control signal;

means for playing back said second control signal including a second playback device spaced from said first playback device by the same distance and in the same direction as said second recording track is spaced from said positionally corresponding recording track;

means connected to said video information playback means for controlling said video information playback means with said first control signal during playback of video information from said first recording medium, and for controlling said video information playback means with said second control signal during playback of video information from said second recording medium; and means connected to said first and second control signal playback means and said means for controlling said video information playback means for applying said first control signal to said controlling means in a first state, and for alternatively applying said second control signal to said controlling means in a second state of said applying means.

14. Apparatus as claimed in claim 13, wherein:

said means for applying said first control signal and alternatively said second control signal to said controlling means include switch means for alternatively connecting said first control signal playback means and said second control signal playback means to said controlling means.

15. Apparatus as claimed in claim 13, including:

means operatively associated with said second recording medium for confidentially indicating that said second playback control signal is recorded in said second recording track; and means for sensing said confidential indication that said playback control signal is recorded in said second recording track and for switching said applying means to said second state in response to said sensing.

16. In apparatus for playing back video information from a regular recording having video information recorded on a first recording medium and a first video information playback control signal recorded in a first recording track on said first recording medium for playback by a first playback device, and for alternatively playing back video information from a scrambled recording having video information recorded on a second recording medium and a second video information playback control signal recorded in a second recording track on said second recording medium, with said second recording track on said second recording medium being spaced from any recording track on said second recording medium which would positionally correspond to said first recording track and being so spaced sufficiently to miss said first playback device upon playback of said scrambled recording, the improvement comprising in combination:

a casing for said second recording medium;

means for playing back said video information from said first recording medium and alternatively from said second recording medium;

means including said first playback device for playing back said first control signal;

means for playing back said second control signal including a second playback device spaced from said first playback device by the same distance and in the same direction as said second recording track is spaced from said positionally corresponding recording track;

means connected to said video information playback means for controlling said video information playback means with said first control signal during playback of video information from said first recording medium, and for controlling said video information playback means with said second control signal during playback of video information from said second recording medium;

means connected to said first and second control signal playback means and said means for controlling said video information playback means for applying said first control signal to said controlling means in a first state, and for alternatively applying said second control signal to said controlling means in a second state of said applying means;

means on said casing for confidentially indicating that said second playback control signal is recorded in said second recording track; and means for sensing said indicating means on said casing and for switching said applying means to said second state in response to said sensing of said indicating means.

17. Apparatus as claimed in claim 16, wherein:
said indicating means are constructed to be selectively removable from said casing.

18. In apparatus for playing back video information from a regular recording having video information recorded on a first recording medium, a first video information playback control signal recorded in a first recording track on said first recording medium, and a first video information sound accompaniment recorded in a second recording track on said first recording medium, and for alternatively playing back video information from a scrambled recording having video information recorded on a second recording medium, a second video information sound accompaniment recorded in a first recording track on said second recording medium, said first recording track on said second recording medium corresponding positionally to said first recording track on said first recording medium, and a second video information playback control signal recorded in a second recording track on said second recording medium, said second recording track on said second recording medium corresponding positionally to said second recording track on said first recording medium, the improvement comprising in combination:

means for playing back said video information from said first recording medium and alternatively from said second recording medium;

means for playing back said first video information sound accompaniment from said second recording track on said first recording medium and for alternatively playing back said second video information sound accompaniment from said first recording track on said second recording medium;

means for playing back said first control signal from said first recording track on said first recording medium;

means for playing back said second control signal from said second recording track on said second recording medium;

means connected to said video information playback means for controlling said video information playback means with said first control signal during playback of video information from said first recording medium, and for controlling said video information playback means with said second control signal during playback of video information from said second recording medium; and means connected to said first and second control signal playback means and said means for controlling said video information playback means for applying said first control signal to said controlling means in a first state, and for alternatively applying said second control signal to said controlling means in a second state of said applying means.

19. Apparatus as claimed in claim 18, wherein:
said means for applying said first control signal and alternatively said second control signal to said controlling means include switch means for alternatively connecting said first control signal playback means and said second control signal playback means to said controlling means.

20. Apparatus as claimed in claim 18, including:
means operatively associated with said second recording medium for confidentially indicating that said second playback control signal is recorded in said second recording track; and means for sensing said confidential indication that said playback control signal is recorded in said second recording track and for switching said applying means to said second state in response to said sensing.

21. Apparatus as claimed in claim 18, wherein:
said means for playing back said first video information sound accompaniment from said second recording track on said first recording medium and said means for playing back said second control signal from said second recording track on said second recording medium jointly include a first playback device common to said first sound accompaniment playback means and said second control signal playback means; and said means for playing back said second video information sound accompaniment from said first recording track on said second recording medium and said means for playing back said first control signal from said first recording track on said first recording medium jointly include a second playback device common to said second sound accompaniment playback means and said first control signal playback means.

22. Apparatus as claimed in claim 21, wherein:
said means for applying said first control signal and alternatively said second control signal to said controlling means include switch means for alternatively connecting said common first playback device and said common second playback device to said controlling means.

23. In apparatus for playing back video information from a regular recording having video information recorded on a first recording medium, a first video information playback control signal recorded in a first recording track on said first recording medium, and a first video information sound accompaniment recorded in a second recording track on said first recording medium, and for alternatively playing back video information from a scrambled recording having video information recorded on a second recording medium, a second video information sound accompaniment recorded in a first recording track on said second recording medium, said first recording track on said second recording medium corresponding positionally to said first recording track on said first recording medium, and a second video information playback control signal recorded in a second recording track on said second recording medium, said second recording track on said second recording medium corresponding positionally to said second recording track on said first recording medium, the improvement comprising in combination:

a casing for said second recording medium;

means for playing back said video information from said first recording medium and alternatively from said second recording medium;

means for playing back said first video information sound accompaniment from said second recording track on said first recording medium and for alternatively playing back said second video information sound accompaniment from said first recording track on said second recording medium;

means for playing back said first control signal from said first recording track on said first recording medium;

means for playing back said second control signal from said second recording track on said second recording medium;

means connected to said video information playback means for controlling said video information playback means with said first control signal during playback of video information from said first recording medium, and for controlling said video information playback means with said second control signal during playback of video information from said second recording medium;

means connected to said first and second control signal playback means and said means for controlling said video information playback means for applying said first control signal to said controlling means in a first state, and for alternatively applying said second control signal to said controlling means in a second state of said applying means;

means on said casing for confidentially indicating that said second playback control signal is recorded in said second recording track; and means for sensing said indicating means on said casing and for switching said applying means to said second state in response to said sensing of said indicating means.

24. Apparatus as claimed in claim 23, wherein:

said indicating means are constructed to be selectively removable from said casing.

* * * * *